United States Patent [19]

D'Auria

[11] 3,878,515

[45] Apr. 15, 1975

[54] ERASABLE THERMOPLASTIC SYSTEM FOR THE OPTICAL STORAGE OF DATA

[75] Inventor: Luigi D'Auria, Paris, France

[73] Assignee: Thomson-CSF, Paris, France

[22] Filed: July 27, 1973

[21] Appl. No.: 383,197

[30] Foreign Application Priority Data

Aug. 1, 1972 France .............................. 72.27709

[52] U.S. Cl...................... 340/173 TP; 340/173 LT; 340/173 LS; 340/173 LM

[51] Int. Cl. ....................... G11c 11/46; G11c 13/04

[58] Field of Search. 340/173 TP, 173 LM, 173 LS, 340/173 LT; 346/74 TP

[56] References Cited

UNITED STATES PATENTS

| | | | |
|---|---|---|---|
| 3,026,417 | 3/1962 | Tomlinson | 340/173 LS |
| 3,158,842 | 11/1964 | Anderson | 340/173 LS |
| 3,486,031 | 12/1969 | Lynch | 340/173 LS |
| 3,560,205 | 2/1972 | Urbach | 340/173 TP |
| 3,631,411 | 12/1971 | Kosonocky | 340/173 LS |

*Primary Examiner*—Stuart N. Hecker
*Attorney, Agent, or Firm*—Cushman, Darby & Cushman

[57] ABSTRACT

A system for optical data storage and erasure, using a thermoplastic material and a plurality of heating elements associated therewith. A photosensitive switch series connected with each of the heating elements controls the flow of a heating current, for either writing-in or erasing a group of optical data in each storage area of the thermoplastic material.

8 Claims, 6 Drawing Figures

ERASABLE THERMOPLASTIC SYSTEM FOR THE OPTICAL STORAGE OF DATA

The present invention relates to the field of erasable data storage systems; it relates more particularly to a mosaic of storage elements using a thermoplastic material and its application to an optical store.

An optical store utilizing a thermoplastic material is generally constituted by the deposition, upon a transparent substrate, of a heating element, a film of photoconductive material and a film of thermoplastic material. The recording of optical data is produced, after having previously electrically charged the assembly of the photoconductive and thermoplastic films, by a first phase, the purpose of which is to optically project the data (also referred to as the image) onto the photoconductive film, in order to achieve a non-uniform distribution of said electrical charges in its own plane, followed or accompanied by a second phase of heating the thermoplastic material by means of the heating element, until said material reaches a point at which it melts to give a pasty consistency; under the action of the electrostatic forces, the thermoplastic surface distorts, its thickness being a function of the received light energy; it is then merely necessary to leave the thermoplastic material to cool, in order to retain the data. The erasing of the data, thus recorded, is achieved by merely reheating the thermoplastic material.

In the majority of applications, it is convenient to utilize one and the same substrate for the selective recording or erasing of several images side by side, independently of one another, the device then forming a mosaic of elements, or storage areas. Then, it is necessary to assign a heating element to each of the storage areas and to provide a system of addressing these elements so that for each of the positions occupied in the mosaic, there is an electrical connection with terminals located at the substrate periphery; this requirement means that it is necessary to allow certain spacing between two adjacent storage elements in order to give passage to electrical leads, and this constitutes a wasteful limitation on the number of images which it is possible to record within a given overall area. In other words, if we define the utilization ratio as the useful area to the total area, then this varies in inverse proportion to the number of storage positions of the device and it is virtually impossible to exceed 10% in the case of devices having a capacity of 100 × 100 storage areas.

In accordance with the present invention, there is provided an erasable system for the optical storage of data, said arrangement comprising: a substrate, a plurality of adjacent photosensitive storage elements arranged on said substrate, a plurality of switching elements being selectively optically activated, electrical connecting means having terminals on which is available external electrical energy; each of said photosensitive storage elements incorporating an electrically conductive path causing the writing and the erasure of said data upon being energized; said electrically conductive path being series connected with said electrical connecting means across one of said switching elements.

For a better understanding of the invention and to show how the same may be carried into effect, reference will be made to the following description and the attached figures, among which:

Figure 1:
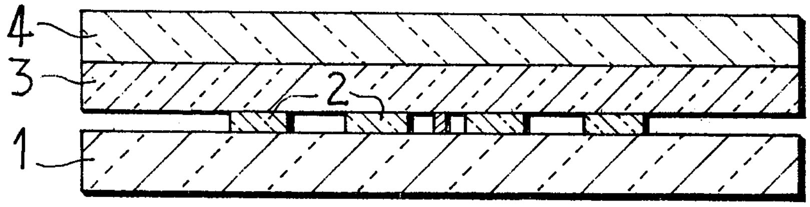
Fig. 1 PRIOR ART
FIGS. 1 and 2 illustrate sectional and plan views of a prior art mosaic of elements for storing optical data.

FIG. 1 illustrates a schematic section through a prior art thermoplastic device for recording optical data. This device is constituted by a transparent substrate 1, made of glass for example, upon which there are successively deposited: Transparent heating elements 2; a film of photoconductive material 3; and a film of thermoplastic material 4. The heating elements 2 are made for example in the form of fine tin-oxide films; the films 3 and 4 are often constituted respectively by polyvinyl carbazole incorporating sensitisers such as trinitrofluorenon, and by a hydrogenated colophane. A device of this kind, forming a matrix or mosaic, is designed to record n images side by side, independently of one another, and to this end comprises n heating elements 2. The connections between the elements have not been shown.

Utilisation of this device comprises, as those skilled in the art will appreciate, the following operations which are carried out successively or simultaneously:

- uniform charging up of the surface of the thermoplastic film 4 by electrical means which have not been shown;
- exposure of the device to the optical data which is to be recorded at the substrate 1 side, by projection of an optical image, this modifying the distribution of electrical charges carried by the faces of the photoconductive film 3;
- recharging of the device in a non-uniform fashion due to the fact that its internal electrical charge distribution is itself non-uniform;
- heating of the device by passing a heating current through the elements 2 until the thermoplastic film 4 reaches the point at which it melts to a pasty consistency, said thermoplastic film 4 then distorting in thickness, as a function of the distribution of charges;
- cooling the device in order to retain the distortions experienced by the thermoplastic film 4 under the influence of the non-uniform electrostatic forces.

The erasing of the data thus recorded is carried out by reheating the device using elements 2 without applying optical radiation or biasing field.

Figure 2:
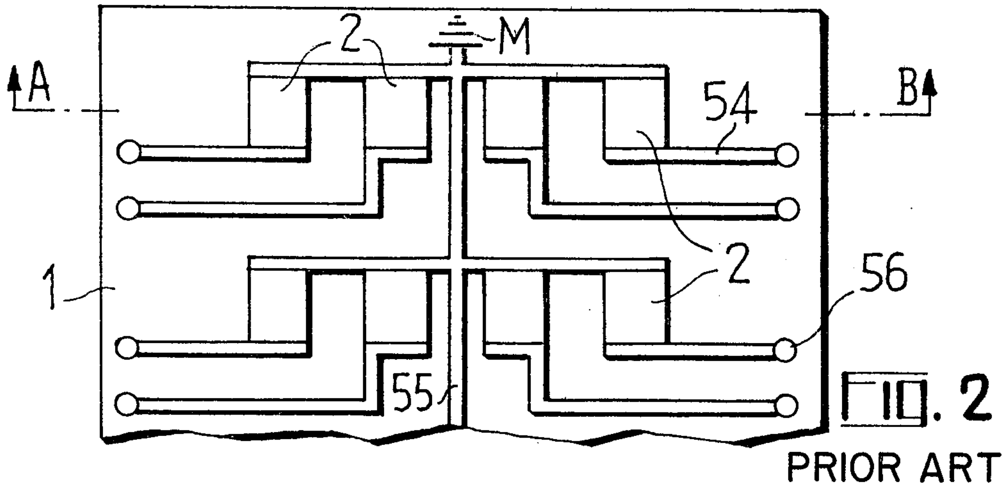
Fig. 2 PRIOR ART

FIG. 2 is a frontal view of the mosaic of storage elements shown in FIG. 1, the figure illustrating the electrical connecting means between two heating elements, the films 3 and 4 having been omitted simply in order to clarify the illustration.

In this embodiment, the heating elements 2, carried by the substrate 1, are connected on the one hand in columns to a common connection 55 terminating at the periphery of the device in a terminal M, and, on the other hand, in each case to individual terminals (such as 56) similarly situated at the periphery of the device, through the medium of an individual conductor (such as 54).

Several geometric forms are possible as far as the conductors linking each element 2 with the periphery of the device are concerned, but in all cases, the spacing which it is necessary to provide between two adjacent elements 2 is very large, as FIG. 2 shows.

Figure 3:
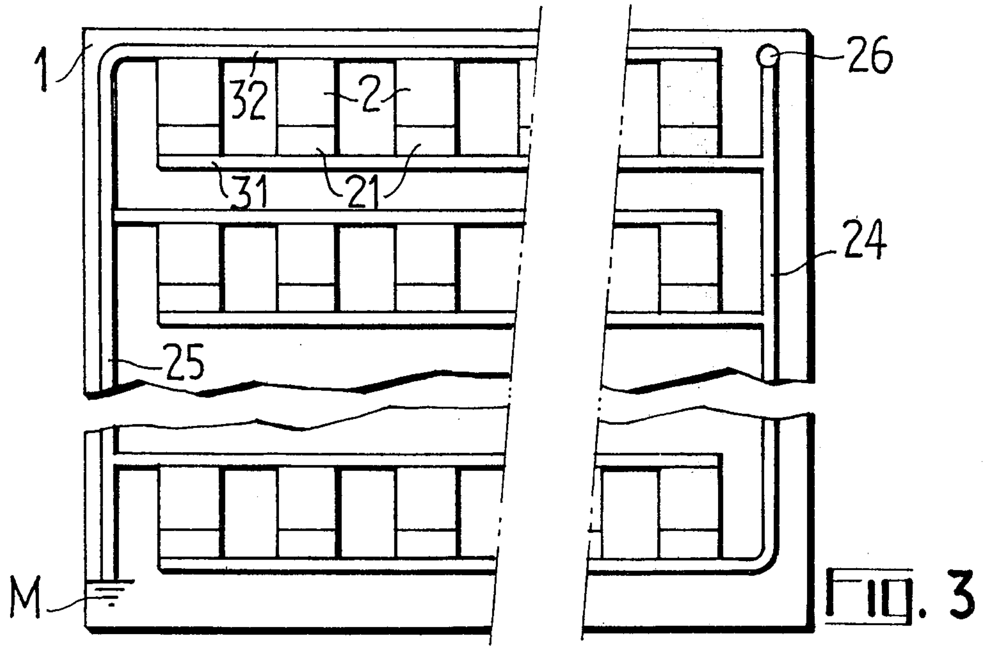
FIG. 3 illustrates an embodiment in accordance with the invention.

FIG. 3 illustrates an embodiment of a mosaic of elements for storing optical data, in accordance with the invention. FIG. 3 shows the transparent substrate 1 and the heating elements 2, deposited on the surface of the substrate 1, complete with their electrical connecting means.

The elements 2 are electrically conductive paths, provided for heating the thermoplastic material, as shown in FIG. 1. These elements are for example deposited in rows and electrically connected to electrical connecting means which receive the heating voltage furnished by a voltage source that has not been shown. These means are represented, on FIG. 3, by two conductors 31 and 32 in the case of the first row of elements 2; one of these econductors is connected directly to the element 2 whilst the other is connected there through the medium of a switching element 21, an advantageous embodiment of which can be a photo-resistor constituted by cadmium sulphide or lead sulphide. The two conductors corresponding to each row of elements 2 are connected in pairs through busbar 24, in the case of the first conductors of each row, and busbar 25 in the case of the second conductors; the busbar 24 being terminated by the peripheral supply terminal 26.

To permit recording of optical data in a storage area, or storage element, corresponding to one of the elements 2, it is sufficient to apply a heating voltage between the terminals 26 and M, and to project the image onto the storage area in question, the photoresistors 21 playing the part of a swtich by only allowing current to flow under the influence of the radiated energy used to locally project the optical data.

However, in order to independently control recording or erasing, it may be necessary for recording the optical data to simultaneously project a fraction of the radiated energy onto the corresponding photo-resistor 21.

This system, as FIG. 3 shows, thus makes it possible to achieve a utilisation ratio (effective area/total area) in the order of 50 %, a value very much superior to those obtainable using the various systems known thus far. In addition, that ratio is made independent of the number of recording areas contained in the device, which makes it possible to create large capacity devices.

Figure 4:
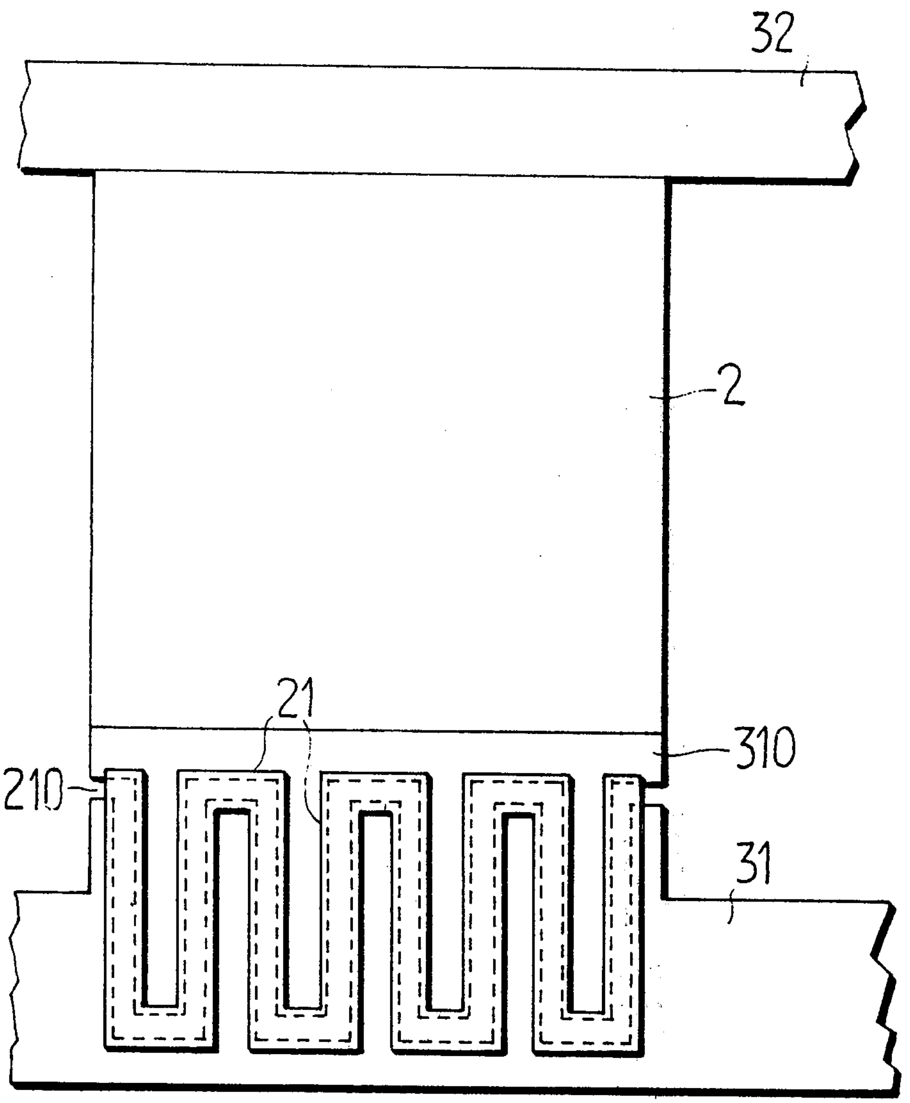
FIG. 4 represents an embodiment of an element of the system shown in FIG. 3.

FIG. 4 illustrates an embodiment of part of the mosaic shown in the preceding figure, namely an element 2, which is transparent and connected on the one hand to the conductor 32 and on the other to a comb-shaped conductor 31 through the medium of a second comb-shaped conductor 310 interleaved with the first 31 and separated from the latter by a gap 210. The photo-resistive element 21, constituted by cadmium sulphide, is deposited in the gap 210 and has a geometric form which may not coincide exactly with that of the gap 210, as shown in FIG. 4; the particular form shown in this figure is due to the fact that the voltage drop in the element 21 is required, when the latter is illuminated, to become small compared with the voltage drop in the element 2.

By way of non-limitative example, the device has been produced with the geometric form shown in FIG. 4, the electrically conductive path 2 taking the form of a square with a sidelength of 2 mm, and the photo-resistor 21 that of a strip 100 micrometers wide forming a rectangular serpentine pattern around 900 micrometers in height; the element 2 has a resistance of around 500 Ω which, for a heating time around three-fourths of a second, necessitates for recording a current of 20 mA, and for erasing, a current of 28 mA. The photo-resistor 31, in the absence of any illumination, has a resistance in excess of $10^7$ Ω and when illuminated with a power of 20 mW/cm ($\lambda = 6328$ A), a resistance of 150Ω, this being substantially lower than that of the resistance of the element 2.

Figure 5:
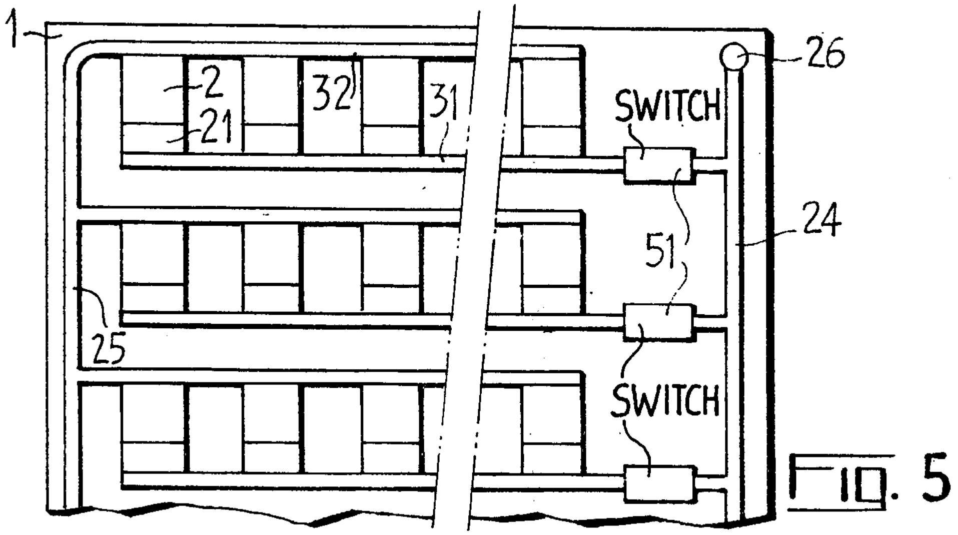
FIG. 5 illustrates a variant embodiment of a mosaic of storage elements in accordance with the invention.

FIG. 5 illustrates a variant embodiment of a mosaic of storage elements in accordance with the invention. In this figure, as in FIG. 3, there have been illustrated the substrate 1, the electrically conductive path 2, the switching elements 21 constituted for example by photo-resistors, the busbars 24 and 25, the supply terminal 26 and the pairs of conductors (31 and 32 in the case of the first row), connecting each row of elements 2 to the busbars 24 and 25.

In comparison with the embodiment described in FIG. 3, a further switching element 51 has been provided for each row of elements 2, this switch 51 advantageously being arranged close to the periphery of the mosaic and on one of the row conductors (the conductor 31 in FIG. 5). The switch 51 can be designed in any known manner.

A device of this kind will be used in preference to that described in FIG. 3, in cases where a large-capacity mosaic comprising at least 100 × 100 storage elements is involved, because it makes it possible to limit electrical power losses in the unaddressed heating circuits and to avoid the resultant temperature rise, the latter being prejudicial to proper conservation of the data stored in the thermoplastic material.

Figure 6:
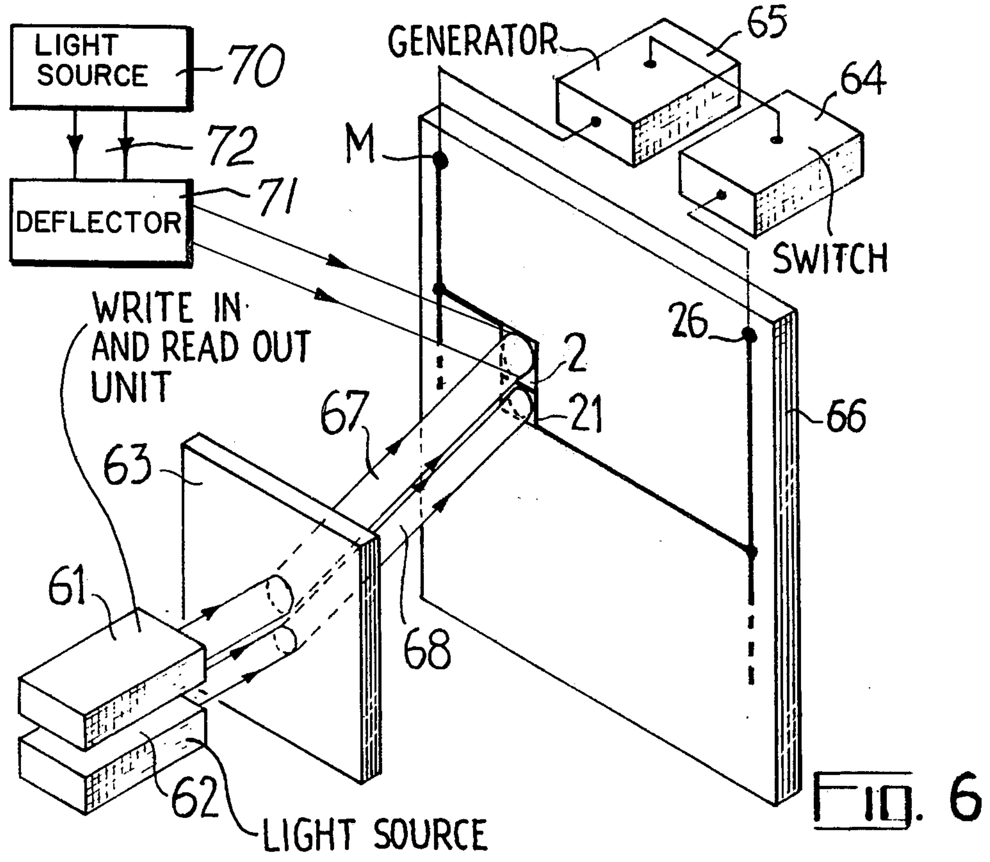
FIG. 6 illustrates an erasable system for the optical storage of data in accordance with the invention.

FIG. 6 illustrates an erasable system for the optical storage of data in accordance with the invention. In this figure, there have been illustrated: the mosaic as described in FIG. 3, here marked 66, showing simply one of the electrically conductive paths 2, the photo-resistor 21 associated therewith and the leads connecting said element to the supply terminals 26 and M; a generator 65 supplying the heating voltage required for operation of the mosaic 66 and connected to the terminals M and 26, a switching device 64 being arranged in said latter connection; a write-in and read out unit 61 furnishing a beam of radiated energy 67, which, in the case of recording, carries the data for recording; a light deflector 63 arranged in the trajectory of the beam 67 and performing the addressing of one of the storage elements of the mosaic 66, and a source 62 which briefly produces a beam of radiated energy 68, deflected by the deflector 63, in order to illuminate the photo-resistor 21 associated with the storage element in question.

For the purpose of recording, data is furnished by the unit 61, in an element of the mosaic 66; the switching device 64 must render the electrical circuit conductive and the source 62 must produce the energy beam so that by virtue of its action on the photo-resistor 21, current is able to flow through the element 2. To read-out the stored data, the unit 61 must produce a read-out beam, but the source 62 must not produce a beam if read-out is to remain non-destructive. For the erasing of the recorded data, the switching device 64 must enable the heating current to flow, through the agency of the power beam supplied by the source 62.

It is possible to carry out recording and erasing of data simply by means of the unit 61 and the beam 67, the radiated energy required for reduction of the resistance of the element 21 then being furnished by the beam 67 itself. To read out the recorded data, and in order to prevent its destruction whilst so doing, it is then merely necessary to open the heating circuit by means of the switching device 64, during the read-out phase.

Such a system 13 is well designed to be used in a holographic memory. As a matter of fact, as those skilled in the art will appreciate, in a memory of that kind what is to be recorded is a fringe pattern, representative of the data, and constructed from the interference of two coherent beams, of radiated energy, one of them being a refrence beam, and the other, an object beam, modulated by said data. Considering the system according to the invention as shown in FIG. 6, it is sufficient to add a further source 70 furnishing said reference beam 72 and means for deflecting and making it to converge on the storage element in question, the object beam being furnished by the unit 61.

What I claim is:

1. Erasable system for the optical storage of data, said arrangement comprising: a substrate, a plurality of adjacent photosensitive storage elements laid on said substrate, in succession, a plurality of electrically conductive paths, a film of photoconductive materials and a film of thermoplastic material; each of said paths defining one of said storage elements, a plurality of switching elements being selectively optically activated, each storage element being electrically connected in series with a different one of said switching elements to form a unit electrical connecting means, having terminals on which is available external electrical energy; each of said photosensitive storage elements incorporating an one said path causing the writing and the erasure of said data upon being energized, at least some of said storage elements being electrically connected in parallel to each other via a switching element to said electrical connection means.

2. A system as claimed in claim 1, comprising further switching elements; said storage elements being arranged in a plurality of rows, each of said rows comprising one of said further switching elements.

3. A system as claimed in claim 1, wherein said switching element is a photoconductive element, the voltage drop which occurs when activating said photoconductive element being lower than the voltage drop occuring in said path.

4. A system as claimed in claim 3, wherein said photoconductive element comprises two conductive electrodes in the form of interleaved combs, and a gap separating said conductive materials, said gap being filled with a layer of cadmium sulphide and said path being made of tin oxide.

5. A system as claimed in claim 1, further comprising a unit supplying a beam of radiated energy selectively illuminating anyone of said storage elements.

6. A system as claimed in claim 5, further comprising a source supplying a further beam of radiated energy, said further beam selectively triggering into conduction said switching elements; said data optically modulating the beam illuminating said storage elements.

7. A system as claimed in claim 5, wherein for recording said data said beam simultaneously illuminates said storage element and the corresponding switching element, said data being read through the medium of said beam illuminating only said storage element.

8. A system as claimed in claim 5, wherein said unit is a holographic system supplying a reference beam crossing said beam at said storage element for forming a fringe pattern representative of said data; said beam illuminating both said storage element and the corresponding switching element.

* * * * *